United States Patent [19]

Egidi et al.

[11] 4,369,160
[45] Jan. 18, 1983

[54] PRESS AND PROCESS FOR VULCANIZING ANNULAR ELEMENTS

[75] Inventors: Paolo Egidi, Monza; Federico Squerti, Milan, both of Italy

[73] Assignee: Industrie Pirelli, S.p.A., Milan, Italy

[21] Appl. No.: 279,568

[22] Filed: Jul. 1, 1981

[30] Foreign Application Priority Data

Jul. 23, 1980 [IT] Italy ............................... 23622 A/80

[51] Int. Cl.³ ..................... B29H 7/22; B29D 29/00
[52] U.S. Cl. ............................... 264/326; 425/28 B; 425/339; 425/193
[58] Field of Search .............. 264/326; 425/28 B, 339, 425/193, 394

[56] References Cited

U.S. PATENT DOCUMENTS

3,647,342  3/1972  Hunt ............................... 425/394 X
3,868,204  2/1975  Bougers .......................... 425/339 X
3,964,851  6/1976  Bougers .......................... 425/339 X Primary Examiner—J. Howard Flint, Jr.
Attorney, Agent, or Firm—Stevens, Davis, Miller & Mosher

[57] ABSTRACT

A press for vulcanizing annular elements, in particular belts for motion transmission is provided. The press can be used to vulcanize belts having different dimensions and shapes. A device for varying the distance between the pulleys on which the belts are mounted for the vulcanization is separated from the vulcanizing device and provides for variation of the distance between the pulleys for loading and discharging the belts.

17 Claims, 4 Drawing Figures

PRESS AND PROCESS FOR VULCANIZING ANNULAR ELEMENTS

The present invention relates to a press and to a process for vulcanizing annular elements and, in particular, to a press and to a process for vulcanizing cross-linkable elastomeric or plastomeric belts, especially V-belts.

Presses for vulcanizing annular elements are already known in which the annular elements are mounted on longitudinally spaced rollers and the free portion (or free portions) of the annular elements stretched between the rollers, is vulcanized and molded between two (or more) hot tables or platens associated with the press. One of the rollers is provided with a drive to rotate the annular element after a portion or segment has been vulcanized and molded.

These known presses have several drawbacks, among which are the high consumption of steam and, above all, lack of uniformity in the finished article produced by the presses.

The high consumption of steam arises from the fact that the annular elements when vulcanized must cool while remaining stretched between the rollers of the press in order to guarantee a minimum of stabilization to the finished product. Further to increase the rate of cooling, water is sprayed on the already vulcanized annular elements. Therefore, the hot tables in which steam circulates, are cooled substantially during these operations and will require subsequently a larger amount of steam to return to the vulcanizing temperature when a new annular element is mounted on the rollers and inserted between the tables of the press.

Moreover, the heat radiated by the hot tables reduce the rate of cooling of the annular elements stretched between the spaced rollers. All this results in a long stop time between one vulcanizing cycle and the subsequent one.

The non-uniformities found in the finished articles produced with these known types of vulcanizing presses are the result of the already mentioned difficulties in the cooling of the vulcanized articles, or from the absorption of the cooling water by the vulcanized articles with consequent possible damage to the stretch resistant insert member embedded in the body of the article, or from different tensioning of the annular elements to be vulcanized.

In fact, the tensioning device is the device which also varies the pitch between the rollers about which the annular element is looped.

The tensioning device is the same device which moves the rollers to adjust the distance therebetween to adapt the press for vulcanizing annular elements of different dimensions.

Consequently, when the tensioning of an annular element mounted on the rollers is effected, there is a risk of tensioning the annular element too much or too little, thereby varying the configuration of the annular element with consequent movement of the resistant insert member, if present, within the annular element.

Consequently, with these known types of vulcanizing presses, the possibility exists of molding and vulcanizing annular elements and subsequently of cooling the elements while maintaining them on rollers so as to have them stabilized with the rollers having a pitch different from the desired one.

In this way the lifetime and resistance characteristics of annular elements vulcanized and stabilized on the same press can vary from one element to the other.

It is an object of the present invention to provide a press and a process for vulcanizing and molding annular elements of elastomeric or plastomeric material, as for example drive belts, which produce products having uniform characteristics from one to the other. Another object of the invention is to provide a press and process for vulcanizing elastomeric or plastomeric endless belts or the like which can be operated with less down time then prior art presses.

Other objects will become apparent from the following description with reference to the accompanying drawing wherein.

The foregoing objects and others are accomplished in accordance with this invention, generally speaking, by providing a press for vulcanizing annular elements such as endless belts comprising a first assembly having at least one vulcanizing table, two interchangeable second assemblies each comprising at least one vulcanizing table, and at least one pair of spaced rollers, of which one roller is associated with a means for driving it and the other roller idles, on which the annular elements to be vulcanized are mounted, means for coupling, alternately, the first assembly with one of the second assemblies, and means for moving together and for pressing the first and second vulcanizing tables of the first and of the second assemblies which are coupled together against each other.

The invention also provides a process for vulcanizing annular vulcanizable elements by means of a press which has a first assembly having at least one upper and one lower vulcanizing table and two interchangeable second assemblies, each of which comprises at least one pair of rollers on which the annular elements to be vulcanized are mounted and a vulcanizing table interposed between the rollers, characterized by the fact of comprising the steps of:

(a) coupling said first assembly alternately with one of the second assemblies;

(b) advancing the vulcanizing table of the second assembly into contact with one of the vulcanizing tables of the first assembly;

(c) advancing into contact a second vulcanizing table of the first assembly with the tables which are already in contact with each other; and (d) pressing the tables of the first and second assembly the one against the other so as to vulcanize and to mold the portions of annular elements between the tables.

The press is particularly advantageous for vulcanizing motion transfer belts or drive belts as, for example, V-belts.

In its more general aspects, the press according to the present invention has three assemblies, a first assembly provided with at least one vulcanizing table and two second assemblies, substantially equivalent to each other, each of the second assemblies comprising at least one vulcanizing table inserted between the rollers of at least one pair of rollers on which the annular elements to be vulcanized are mounted, means for alternately coupling a vulcanizing table of the first assembly with the selected vulcanizing table of the second assembly and means for moving the tables together and pressing the thus coupled tables one against the other.

Figure 1:
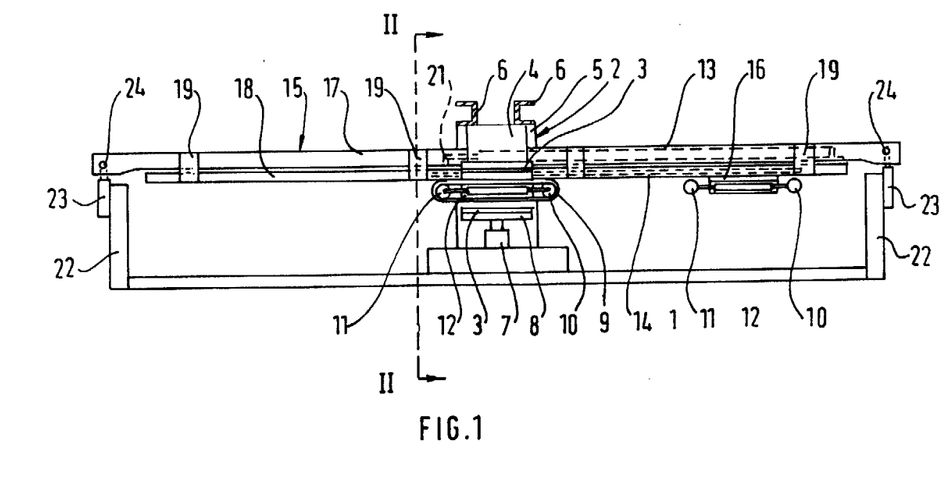
FIG. 1 is a diagrammatic side elevation of one embodiment of a press having a first and two interchangeable second assemblies provided by the invention.

The press for vulcanizing V-belts illustrated in FIG. 1 has a base 1 supporting a first assembly 2 (see also FIG. 2) provided with at least one vulcanizing table.

Figure 2:
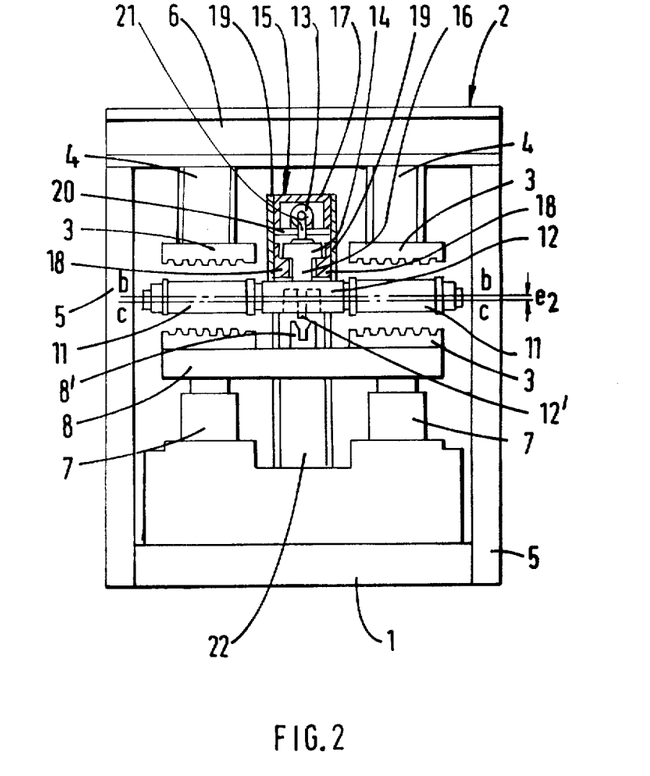
FIG. 2 is a cross-section of the press taken along the line II—II of FIG. 1.

Preferably, as shown in FIG. 2, the first assembly has four vulcanizing tables 3 arranged as two pairs superimposed one over the other and arranged symmetrically with respect to the longitudinal axis of symmetry of the press. Tables 3 are provided on their surfaces with grooves having the shape and dimension of the belts which are to be vulcanized.

Each of the two upper tables 3 is connected to a support 4, the support projecting from the lowr side of a frame having lateral upright members 5 and upper cross-member 6. Associated with the first assembly, means are provided to move one table towards and to press a table of the first assembly against a table of the selected second assembly coupled to the first assembly.

The means for moving the tables comprise (in addition to the other means described hereinafter) two cylinder-piston groups 7 associated with the two lower tables 3 (or alternatively to the upper tables 3). The two cylinder-piston groups 7 are preferably driven by a single pump to have the same pressure in the cylinders so as to advance in a uniform way a table holder plate 8 to which the vulcanizing tables 3 are connected.

Table holder plate 8 is provided with guides (not shown in the figure) to direct movement towards the upper tables 3. Preferably, the vulcanizing tables 3 are removable both from the supports 4 and from the table holder plate 8 so as to vulcanize with the same press also belts having different sections both in shape and dimensions.

The press according to the present invention is provided in addition to the first assembly, with two second assemblies (equal to each other) each of said second assemblies being provided with at least one vulcanizing table and at least one pair of rollers of which one is provided with a drive means and the other is idle.

In FIG. 1 the interchangeable second assemblies are shown in correspondence with the first assembly, in central position with respect to the observer who looks at FIG. 1, and the belts 9 ready to be vulcanized and shaped are shown on it, while the other second assembly having spaced rollers 10 and 11 is shown on the right side of the press, as observed in FIG. 1. The second assemblies have two pairs of rollers arranged symmetrically with respect to the longitudinal axis of symmetry of the press, a roller of each pair being a motorized or driven roller 10 and the other an idle roller 11. A heated vulcanizing flat table or platen 12 is interposed between the rollers 10 and 11, the large surface of the vulcanizing flat table acting as a supporting plane for the free portions of the belts 9 and being treated in a per se known way so that the belts do not adhere.

The press according to the present invention provides in addition, means for coupling alternatively the first with the second assemblies. These means are, in the particular embodiment shown in FIGS. 1 and 2, translating means which transfer alternatively a second assembly into the fixed positon occupied by the first assembly. These means for coupling the first assembly alternatively with said second assemblies, i.e. translating means which transfer the second assemblies into the fixed position of the first assembly, are a double-acting cylinder-piston group 13 and a shoe 14 associated with the cylinder-piston group 13 indicated with dashed line in FIG. 1 since they are disposed in a beam 15, arranged along the longitudinal axis of symmetry of the press, which extends substantially over the whole length of the press.

The two second assemblies of the press according to the present invention are fixed through a connection member 16 to the ends of shoe 14.

In FIG. 2 it is possible to see in detail the structure of the beam 15 and of the shoe 14. Beam 15 is constituted in the upper part by an inverted U-shaped member 17 and in the lower part by two angle bars 18 which act as support and guide for the shoe 14. The two angle bars 18 are connected to the U-shaped member 17 by means of a pair of plates 19 (see also FIG. 1). The cylinder of the cylinder-piston group 13 is disposed on a sheet 20 which closes the lower part of U-shaped member 17 only for about one-half of its own length. The other half of U-shaped member 17 is open in the lower part to permit one portion of the L-shaped member 21 connecting the stem of the cylinder-piston group to the shoe 14, to translate inside U-shaped member 17.

The ends of beam 15 are supported by two pillars 22 with the interposition of means for approaching and pressing the upper vulcanizing tables of the first assembly with those of one of the second assemblies.

These means comprise, in addition to the cylinder-piston groups 7 associated with the lower vulcanizing table 3 of the first assembly, in the particular embodiment shown in FIG. 1, two cylinder-piston groups 23, for example, single-acting cylinder-piston groups having their cylinders firmly fixed to pillars 22, while the stems of the pistons are connected to the beam 15, through a hinge formed by a pin 24 which is inserted in the ends of the stems and into the end of the beam 15.

Moreover, in FIG. 2, it is possible to see means which insure correct coupling of the lower and upper tables 3 of the first assembly with the flat table 12 of one of the second assemblies.

These means comprise a tapered substantially U-shaped groove 8' placed on the lower table holder plate 8 and a projection 12' surrounded on its lateral sides by two cavities, projection 12' being placed on flat table 12.

Projection 12' is inserted into the cavity of the U-shaped tapered groove 8', while the arms of the U of tapered groove 8' are inserted in the cavities adjacent to projection 12'.

A further tapered groove (not shown) is present on the horizontal portion of the inverted U-shaped member 17 of the beam 15, while another projection (not shown), provided with cavities on its lateral sides, is present on the lower face of the upper cross members 6 of the first assembly 2, to guarantee correct alignment between the upper tables 3 of the first assembly 2 and the flat table 12 of the second assemblies.

Figure 3:
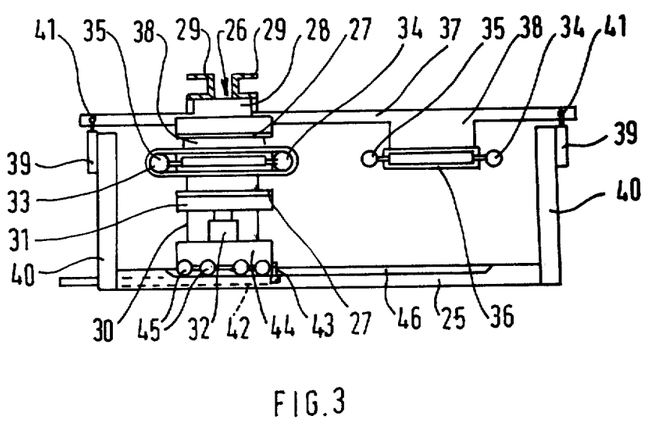
FIG. 3 illustrates diagrammatically in side elevation a second embodiment of the invention.

An alternative embodiment of a press for vulcanizing annular elements according to the present invention is shown in FIG. 3. This alternative embodiment, for example of a press for vulcanizing and molding drive V-belts, has a press provided with a base 25 to which a frame 26 is associated. On frame 26 there is present a first assembly comprising four vulcanizing tables 27 (only two are visible) arranged in two pairs superimposed one with the other and symmetrical with respect to the longitudinal axis of symmetry of the press.

The arrangement of the vulcanizing tables 27 is therefore similar to the arrangement of the vulcanizing tables 3 shown in FIG. 2. Vulcanizing tables 27 are provided on their surfaces with grooves having the shape and dimensions of the belts which are to be vulcanized and molded.

Each of the two upper tables 27 is connected to a support member 28 projecting from the lower side of two upper cross-members 29 which together with two vertical uprights 30 (only one is visible) form the structure of the frame 26.

The two lower tables 27 are mounted on a table holder plate 31 provided with means suitable to move and to press table 27 of the first assembly against the tables of one of the second assemblies coupled with the first assembly. These means comprise (in addition to other means described hereinafter), in the particular embodiment shown in FIG. 4, two cylinder-piston groups 32 (only one is visible).

Also the press according to this alternative embodiment has two interchangeable second assemblies, each of which is provided with at least one pair of rollers, one roller connected to drive means and the other idle, and with a vulcanizing table placed between the rollers of each pair of rollers. These second assemblies are shown in FIG. 3, one in correspondence of the first assembly (on which driving belts 33 are mounted) and the other on the right side of the press to an observer who looks at FIG. 3.

The second assemblies are like the second assemblies described briefly in the explanation of the press shown in FIGS. 1 and 2 and which will be described in detail in the explanation of FIG. 4.

Each of the second assemblies is provided with two pairs of rollers, placed symmetrically with respect to the longitudinal axis of symmetry of the press, each pair of rollers being formed by a drive roller 34 and by an idle roller 35. A flat vulcanizing table 36 is provided between the rollers of each pair of rollers. The second assemblies are mounted on a beam 37 through a connection member 38. The second assemblies in the particular embodiment of the press according to the present invention shown in FIG. 3 are fixed with respect to beam 37. Beam 37 (as the beam 15 of FIGS. 1 and 2) is associated with means suitable to approach and to press the vulcanizing tables of the first assembly against the one of the second assemblies which is coupled to the first assembly.

These means comprise, in addition to the cylinder-piston groups 32, associated with the first assembly in one particular embodiment, two cylinder-piston groups 39 mounted on two pillars 40 by means of their cylinders and to the beam 37 by means of pins 41 inserted into the ends of the stems of the pistons of the group and into the beam 37.

In the particular embodiment of the press shown in FIG. 3 there are present means for coupling the first assembly with one of the second assemblies. These coupling means are translating means which transfer in turn the first assembly into the fixed positions occupied by the second assemblies.

The particular embodiment of the means shown in FIG. 3 is a cylinder-piston group 42 shown with a dashed-line in the figure since it is embedded in the base 25 whose cylinder is fixed to the base 25, while the end of the stem of the piston bears a portion of the L-shaped member 43 fixed to the frame 26. Frame 26 has its own base 44 provided with guiding means as for example, wheels 45 engaged in two grooves 46 parallel to each other (only one is visible in the figure).

Also the vulcanizing press shown in FIG. 3 can be provided with guides and means which guarantee, respectively, correct approaching and coupling of one of the tables to the other of the various assemblies.

Figure 4:
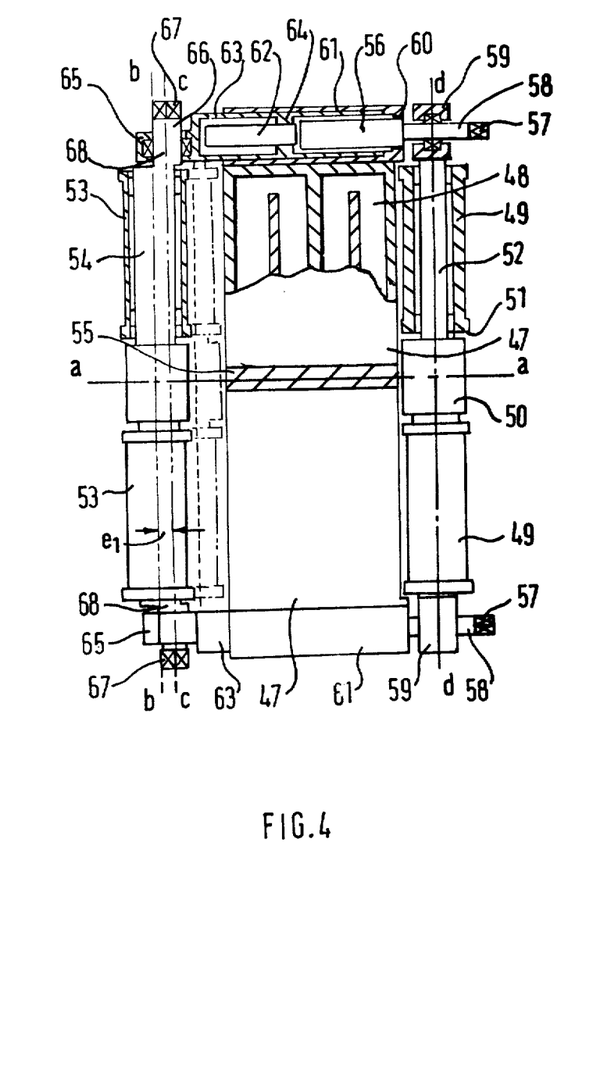
FIG. 4 is an enlarged detail, partially in section, of the second assemblies of the press provided by the invention.

A particular embodiment of one of the second assemblies on the press for vulcanizing annular elements shown in FIGS. 1 and 2 or for the alternative embodiment of the press shown in FIG. 3, is shown partially in section in FIG. 4.

The second assembly shown in FIG. 4 comprises two flat vulcanizing tables 47 provided with conduits 48 to permit the passage of a heating means, as for example steam (said passages are present also in the vulcanizing tables of the first assembly). Flat tables 47 are placed symmetrically on opposite sides with respect to the longitudinal axis of symmetry of the press indicated by the dash and dot line a—a and can be provided on their surfaces with a layer of low coefficient of friction material, as for example polytetrafluoroethylene.

Flat tables 47 are interposed between the rollers of two pairs of rollers in symmetrical position with respect to the axis a—a. Each pair of rollers has a drive roller 49 driven by a single motorized group 50 through a driving device 51, for example formed by a pinion with relative nut and bolt on the inner surface of the rollers 49. The motorized group 50 is integral with one axle (provided with axis of symmetry d—d) on which the drive rollers 49 are mounted through bearings.

The other roller of each pair of rollers is an idle roller 53 mounted on one axle 54 (whose axis of symmetry is indicated with b—b). Between the two flat plates 47 there is present a connection member 55, projecting from the flat surfaces forming flat plates 47, to connect the second assembly to the remaining part of one of the presses (i.e. members 16 and 38 respectively for the embodiments of FIGS. 1 and 2 and of FIG. 3). Axle 52 and axle 54, are mounted to project from the sides of flat plates 47 which are perpendicular to the longitudinal axis of symmetry of the press a—a.

Axles 52 and 54 are associated to first means for varying in equal manner with respect to any point of the flat plates, or of the second assembly, the distance between the two axles. In other words, taking a fixed point on the second assembly, or on the flat plates 47, the distance between the fixed point and each axle 52 and 54 will be increased or will be reduced by actuating the means an equal value although the two distances may be an absolute value different from each other according to the choice of the point.

These distance varying means comprise, in the example shown in the drawing, two pairs of screws each placed on the sides of flat plates 47 parallel to the longitudinal axis of symmetry of the press and farther from the axis. Only one pair of screws is shown in detail since it is in the sectioned part of FIG. 4. The screws of each pair of screws are coaxial the one with the other and in particular a screw 56, actuated through the faceted end 57 of a pin 58 integral with the screw 56, is integral with the first axle 52 which is a spindle 59 of axle 52 firmly connected to pin 58.

The thread present on the body of screw 56 engages with a nut screw 60 present on the inner surface of a cylinder 61 fastened on the side on each flat plate 47. A second screw 62, coaxial with the screw 56, is rotatably connected to the first screw by means of a grooved coupling. Screw 62 is rotated by the same faceted end of the pin 58 because the grooved coupling and screw 62 rotate with the screw 56. This latter, because the nut screw 60, can translate with respect to the cylinder 61 when the pin 58 is rotated.

The thread placed on screw 62 is such as to translate, in a direction opposite to the direction in which the screw 56 translates, a bushing 63, placed within cylinder 61, because of a nut screw 64 present on the inner surface of bushing 63 and engaging with the thread placed on screw 62.

The end 65 of bushing 63 is provided with a seat in which a spindle 66 (whose axis of rotation is indicated with c—c) of the second axle 54 is encased. In this way, by actuating the pins 58, the screw 56 is made to come out of or enter into the cylinder 61 moving thus the axle 52 and at the same time the bushing 63 moves in the opposite direction, i.e. comes out of or enters cylinder 61 thereby moving the axle 54.

In an alternative embodiment of the first means for varying in like manner the distance between the axis and one fixed point of the tables (not shown in the figures), the means comprise two sprocket wheel integral with each other through a single axis crossing the flat plates. Each of the sprocket wheels engages with two rods provided with a rack toothing one rod integral with the bushing 63 and the other with the pin 58. The means for making bushing 63 and pin 58 translate can act directly on the sprocket wheels or on the rods in which case the sprocket wheels have only the purpose of uniformly advancing the rods in the two opposite directions.

In both of the just described examples, actuation of the means can be manual, for example, on the faceted end 57 of the pin 58 or by means of motors of any type acting, for example, on the sprocket wheels.

The assembly shown in FIG. 4 comprises additional second means to tension the annular elements which are mounted on the pairs of rollers to be vulcanized and molded. The second means are associated with the axles and, in particular, they are associated with the second axle 54.

This means comprises an eccentricity (indicated with $e_1$ in FIG. 4) between axis of symmetry b—b of the axle 54, and the axis of rotation c—c of spindles 66 of said axle 54 realized, for example, through a swan-neck connection 68 between spindle 66 and axle 54.

Preferably, the axis of rotation c—c is not contained in the horizontal plane passing through the axis of symmetry b—b (and for the axis of symmetry d—d) giving thus rise to a second eccentricity (indicated in FIG. 2 with $e_2$) which permits movement of axle 54 without damaging the belts mounted thereon. In fact, the double eccentricity permits with its own component $e_1$ tensioning or slackening of the belts while its own component $e_2$ makes it possible to reduce the movement of the trajectories run by the single points of the outline of the rollers 53 (which is also the trajectory run of the belts mounted on the rollers), when idle rollers 53 and the axle 54 rotate around the axis of rotation c—c of the spindles 66, with respect to the tensioning position of the belts themselves.

This double eccentricity permits, acting on one of the faceted ends 67 of the spindles 66, for example, through a lever, to transfer the axis of symmetry b—b on the right side of the axis of rotation c—c (as seen in FIG. 4) thus bringing axle 54, on which the idle rollers 53 are mounted, in the position indicated with the dashed line in FIG. 4, approaching therefore the axle 54 to the axle 52 and relieving the tension on the belts mounted on the rollers.

The means for tensioning the annular elements can be, in alternative to the eccentricity between axis of rotation c—c of the spindles and the axis of symmetry b—b of the axle 54, devices, for example, mechanical devices, which translate the axis of symmetry b—b of axle 54 in which desired direction having a component so as to increase the distance between b—b and d—d: preferably in the direction lying on the plane containing both axis d—d and axis b—b. In these cases the axes c—c and b—b can be coincident to each other.

The operation of a press according to the present invention for vulcanizing annular elements is the following, with particular reference to the press shown in FIGS. 1 and 2.

For the alternative embodiment of the press shown in FIG. 3 it is to be understood that the operation is like that which will be now described except for the obvious difference that the first assembly will move alternatively in the fixed position of the second assemblies and not vice versa as it happens for the press in FIGS. 1 and 2.

Therefore, if both the second assemblies are discharged, the operation is the following. On the second assembly, which is not coupled with the first assembly (i.e. that on the right side of FIG. 1) the driving V-belts are mounted still uncured after having fixed the distance between axle 52 and axle 54 to that previously determined for the type of belt to be vulcanized by actuating the device provided with coaxial screws.

In order to effect the assembly, axle 52 is moved (see both FIG. 1 and FIG. 4) into the position indicated with the dashed line in FIG. 4 by actuating through a suitable lever the faceted end 67 of the spindle 66.

At this point, the belts to be vulcanized are loosely mounted on each pair of rollers associated with the second assembly.

When the belts have been mounted on the pairs of rollers, they are put under tension bringing once again the axle 54 to the position shown in FIG. 4 by rotating the end 67 of spindle 66. At this point the shoe 14 is set in motion conveying a fluid under pressure into the cylinder-piston group 13 which pushes the stem of the piston out of the cylinder, makes shoe 14 translate, coupling the second assembly on which the belts are mounted, with the first assembly.

The other second assembly, at the same time is transferred to the position (empty in FIG. 1) placed on the left side of the first assembly and the assembling operation of a group of belts just described can be started on the first assembly.

The molding and vulcanizing operations are now started for the uncured belts mounted on the second assembly coupled with the first assembly. In order to effect this, it is necessary to draw the vulcanizing tables of the two assemblies close to each other. This is achieved by conveying a fluid under pressure first into the cylinder-piston groups 23 placed at the end of the beam 15.

In this way beam 15 is lifted, and with it also shoe 14 and the two second assemblies integral with it. The flat tables 12 placed on the second assembly contact the two upper tables 3 present on the first assembly and the belts mounted in contact with the flat tables are inserted into the grooves present on the surface of upper tables 3.

Subsequently, fluid under pressure is conveyed into the cylinder-piston groups 7 to move the lower tables 3 of the first assembly towards the four tables already in contact with one another of the first and second assemblies. When the two groups of three vulcanizing tables are in contact with one another, the pressure is increased within cylinder-piston groups 7 to press the belts between the tables with the pressure necessary to mold them. Subsequently, steam is sent into the conduits present in the vulcanizing tables.

When the two portions of each of the belts between the tables are molded and vulcanized, the press is opened partially as much as is necessary to remove the belts from the grooves lowering the lower tables 3 of the first assembly, removing the fluid, for example by gravity, and lowering the beam 15 drawing away thus the flat tables of the second assemblies from the upper tables 3 of the first assembly.

At this point the motorized group 50 is set in action which, acting on the drive rollers 49, disposes on the surfaces of the flat tables of the second assembly facing the vulcanizing tables 3 of the first assembly, two portions not yet vulcanized of the belts mounted on the pairs of rollers of the second assemblies.

The press is closed again by placing near the vulcanizing tables of the first and of the second assemblies with the previously described operations, and additional steam is charged to the tables until the portions of the belts present between the vulcanizing tables are vulcanized.

The process is continued until the complete vulcanization of the entire length of the belts mounted on the rollers.

At this point, the press is completely opened lowering at first the lower tables 3 of the first assembly and then the beam 15 with shoe 14 to which the second assemblies are bound.

Now it is possible to actuate the cylinder-piston group 13 so as to make the shoe 14 return with the two second assemblies to the position shown in FIG. 1.

The second assembly which is now coupled with the first assembly, and on which the uncured belts have been previously mounted, can now start the same vulcanizing and molding cycle of the belts as that just described. The second assembly, which has been uncoupled from the first assembly on which the vulcanized belts are mounted, starts now the cooling cycle of the belts maintaining the belts mounted under tension on the pairs of rollers of the second assembly.

The cooling cycle starts by making the temperature of the various portions of the belts mounted on the rollers of the second assembly uniform. This uniformity is obtained by actuating drive rollers 49 to advance all the portions of the belts (i.e. also the portions which have been vulcanized first and which should be at this point colder than the portions vulcanized later) into contact with the flat table 12. In this way all the portions of the belts mounted on the rollers of the second assembly reach a uniform temperature and subsequently can cool following a single cooling curve. Thus the whole development of all the belts is stabilized in a uniform manner and each belt vulcanized subsequently between the rollers.

Since there are no problems from loss of machine time, cooling can be achieved in air without subjecting the vulcanized belts to jets of cold water and its attendant affect on the finished product, such as absorption of water. In fact, while the belts cool, the press continues to mold and vulcanize belts mounted on the other second assembly.

When the vulcanized belts have been stabilized by cooling them sufficiently, they are removed from the pairs of rollers present on the second assembly, rotating the end 67 of the spindle 66 of the axle 54, bringing thus this latter in the position indicated with the dashed line in FIG. 4. The belts are no longer under tension and can be removed from the pairs of rollers and a new set of uncured belts can be mounted in their place to be vulcanized by repeating the just described operations.

Further the present invention provides a process for vulcanizing annular elements, such as drive belts and in particular V-shaped drive belts of cross-linkable elatomeric or plastomeric material.

The process, which can be accomplished with either one of the presses according to the present invention previously described, foresees in its more general aspects, the steps of:

(a) coupling the first assembly alternately with one or the other of the second assemblies;

(b) advancing the vulcanizing table of the second assembly into contact with the vulcanizing table of the first assembly;

(c) advancing the other vulcanizing table of the first assembly with the table already in contact with the first and second assembly; and (d) pressing the tables of the first and second assemblies one against the other so as to vulcanize and to mold the portions of the annular elements between the tables.

The first step in which the first assembly is coupled alternately with one of the two second assemblies can be made either by transferring the second assemblies alternately to the fixed position of the first assembly or by transferring the first assembly alternately to the fixed positions of the second assemblies.

The second step of advancing into contact the vulcanizing tables of the second assembly with one-half of the vulcanizing tables of the first assembly is effected by moving the beam, to which the second assemblies are connected, to bring them into contact preferably with the upper half of the vulcanizing tables of the first assembly. The bringing into contact of the remaining vulcanizing tables of the first assembly, i.e. the lower tables, against the tables of the first and second assemblies already in contact, is effected by lifting the lower tables of the first assembly to bring them into contact with the other tables.

By then increasing the pressure of the fluid in the cylinder-piston groups 7 which effect lifting, the pressure necessary for molding the portions of the annular elements present between the tables is exerted. At this point the tables are heated, with steam, so as to vulcanize the first portions of the belts. These steps are then repeated until the whole development of the belts is vulcanized.

When the whole developments of the belts are vulcanized, the belts are drawn away by lowering at first the lower tables of the first assembly and then the flat tables of the second assembly. At this point the first assembly is coupled with the second of the second assemblies on which other belts to be vulcanized have been mounted.

The vulcanized belts present on the first of the second assemblies are now cooled. The cooling starts through heating of the portions of the belts which have been vulcanized first. In fact, the portions will be at a lower temperature than that of the portions of the belts vulcanized at the end. This heating takes place by actuating the drive rollers on which the belts have been mounted so as to advance into contact with the still hot flat tables the colder portions of the belts. The uniform cooling of the whole belt will begin when the temperature of the belts is uniform along the whole development i.e. when it will be equal to an intermediate value between that which the first vulcanized portions had and that which the last vulcanized portion had at the moment in which the press has been open to couple the first assembly with the other second assembly. In this way an optimal stabilization of the belt is reached. The final cooling can be obtained by continuing to rotate the drive rollers or, if the flat table is already sufficiently cooled, the drive rollers can be stopped.

When the vulcanized belts have been completely cooled and therefore stabilized, they can be removed from the rollers of the second assembly and new belts to be vulcanized mounted in their place.

By means of the presses and of the process according to the present invention the stated objects are achieved. In fact, the presence of two second assemblies permits the first assembly to operate except in the short transfer periods between one second assembly and the other. Therefore machine stop time for cooling, discharging and charging again the rollers on which the belts are mounted is eliminated. Moreover, since the first assembly is almost always working, a constant temperature is maintained and consequently there are great savings as regards steam consumption. Moreover, since the cooling can be effected without machine stop time, it is possible to cool the vulcanized belts slower thus favoring setting of the belts so as to provide better and more uniform characteristics in the finished product.

Finally, having released the tensioning device of the uncured belts mounted on each pair of rollers from the device for varying the pitch between the rollers of the single pairs of rollers, all the belts produced are of the same dimensions and molded and vulcanized under the same tensioning load. As a matter of fact, by placing the belts under tension, it is not possible to vary the dimensions of the same since when the pitch between the rollers has been determined with the suitable coaxial screw device, the tensioning on subsequent charges of belts will always be the same independently of the number of repetitions of the actuation of the tensioning device.

At last the process according to the present invention guarantees a more uniform finished product since it permits the various vulcanizing tables to couple in a better way. In fact, by advancing into contact, centering at first the flat tables of the second assembly with the upper tables of the first assembly and subsequently approaching the lower tables of the first assembly with respect to the other ones already coupled together, the belts are exactly inserted into the grooves in which the belts are subsequently molded and vulcanized.

As a matter of fact, in the known presses, the lower table is that which rising, couples with the intermediate table and subsequently leads the intermediate table against the upper table. But in this case eventual non-parallelism among the various tables or lack of balance due to non-uniformity of weight or to different resistances against the guides of the intermediate tables, can lead easily to a non-perfect parallelism of the planes containing the surfaces of the vulcanizing tables with consequent non-perfect molding of the belts since it is lacking the guarantee that the belts are perfectly inserted into the molding and vulcanizing grooves.

The process according to the present invention guarantees further a perfect and uniform stabilization of the belts already vulcanized. In fact the belts since they are still uncured, are tensioned between the pairs of rollers present on the second assembly, maintaining always the same constant tensioning not only during their vulcanization, but also during their cooling. In particular, tension remains constant until the stabilized and cold belts are removed from the rollers.

Uniformity of the stabilization of the belts is moreover further guaranteed by the step of bringing the belts to a uniform temperature, by heating the colder portions, before cooling the entire length of belts. In this way, a more uniform redistribution of the unavoidable inner tensions which arise within the belts during cooling is obtained.

Although some particular embodiments of the press and of the process for vulcanizing annular elements according to the present invention have been illustrated and described, it is to be understood that the invention includes in its scope any other alternative embodiment accessible to a technician of this field.

What is claimed is:

1. A press for vulcanizing annular elastomeric elements comprising a first assembly comprising a vulcanizing table, interchangeable second assemblies each comprising a vulcanizing table and drive and idle rollers on which the annular elements to be vulcanized are mounted, means for coupling alternatively said first assembly with one of the interchangeable second assemblies, and means for pressing the vulcanizing tables of the two coupled assemblies one against the other.

2. The press of claim 1 wherein coupling means comprise translating means which transfer alternately one of said second assemblies into the fixed position of said first assembly.

3. The press of claim 1 wherein the said means for pressing the vulcanizing tables of the two coupled assemblies one against the other comprises a cylinder-piston group associated with said first assembly and a cylinder-piston group associated with said second assemblies.

4. The press of claim 1 wherein said coupling means comprise translating means which transfer alternately said first assembly into the fixed positions of one of said second assemblies.

5. The press of claim 1 or 4 wherein said means for pressing the vulcanizing tables of the coupled assemblies one against the other comprise a cylinder-piston group associated with said first assembly and a cylinder-piston group associated with said second assemblies.

6. The press of claim 1, 2, or 3 wherein said first assembly comprises a pair of upper vulcanizing tables and a pair of lower vulcanizing tables arranged symmetrically with respect to the longitudinal axis of the press, each table being provided with at least one groove in which a portion of an annular element is molded and vulcanized, a shoe housed in a beam arranged along the longitudinal axis of symmetry of the press, two second assemblies, one for each end of said shoe, each of said second assemblies comprising two pairs of rollers disposed symmetrically with respect to the longitudinal axis of symmetry of the press, one roller of each pair being a drive roller and the other a idle roller, two flat vulcanizing tables disposed between the rollers of each pair of rollers, a double-acting cylinder-piston group associated with the shoe, two cylinder-piston groups each associated with one end of said beam and two cylinder-piston groups associated with the lower pair of vulcanizing tables of said first assembly.

7. The press according to claim 1 or 4 comprising a frame, a double-acting cylinder-piston group associated with said frame, a first assembly associated with the frame comprising two pairs of vulcanizing tables arranged symmetrically with respect to the longitudinal axis of the press, each table being provided with at least one groove in which a portion of an annular element is molded and vulcanized, a beam arranged along the longitudinal axis of symmetry of the press, second assemblies, one at each end of the beam, each comprising two pairs of rollers placed symmetrically with respect to the longitudinal axis of symmetry of the press, one roller of each pair being provided with a drive and the other idle, a flat vulcanizing table inserted between the rollers of each pair of rollers, two cylinder-piston groups associated with the ends of said beam and two cylinder-piston groups associated with the pair of lower vulcanizing tables of said first assembly.

8. The press of claim 6 wherein each of said second assemblies comprises two vulcanizing tables, each table being disposed between the rollers of two pairs of rollers, a first axle on which the drive roller of each pair of rollers is mounted projecting from the first sides of said tables perpendicularly to the longitudinal axis of symmetry of the press, a second axle on which the idle roller of each pair of rollers is mounted, projecting from the sides opposite to said first sides of said flat tables perpendicular to the longitudinal axis of symmetry of the press, first means for varying, in like manner with respect to a fixed point situated on said flat tables, the distance between said first and second axle and second means for tensioning the annular elements mounted on each pair of rollers associated with said axles.

9. The press of claim 8 wherein said first means comprise two pairs of screws coaxial with one another and rotatably connected through a grooved coupling, each pair of screws being placed in correspondence of the two sides of said flat tables parallel to the longitudinal axis of symmetry of the press, the first screw of each pair being integral with the first axle and engaging with a first nut screw integral with the flat table, the second screw of each pair being integral with respect to the flat table and engaging with a nut screw placed inside a bushing integral with the second axle.

10. The press of claim 8 wherein said second means comprise an eccentricity between the axis of symmetry of said second axle and the axis of rotation of the bearing spindles of said second axle and means for moving said axis of symmetry with respect to the axis of rotation of the spindles.

11. Process for vulcanizing annular elements by means of a press comprising a first assembly comprising at least one upper and lower vulcanizing table and two interchangeable second assemblies, each of which comprises at least one pair of rollers on which the annular elements to be vulcanized are mounted and a vulcanizing table interposed between said rollers, characterized by the fact of comprising the steps of:
(a) coupling said first assembly alternatively with one of said second assemblies;
(b) advancing into contact with the vulcanizing table of a second assembly with one vulcanizing table of the first assembly;
(c) advancing into contact the other vulcanizing table of said first assembly with the tables of said first and second assembly which are already in contact; and
(d) pressing the tables of the first and second assembly against each other to vulcanize and to mold the portions of annular elements disposed between said tables.

12. Process according to claim 11 characterized by the fact of comprising the further steps of:
(e) repeating the previous steps (b), (c) and (d) until the whole development of the annular elements is vulcanized; and
(f) coupling said first assembly with the other second assembly while the vulcanized annular elements, present on the first of said second assemblies, are cooled.

13. Process according to claim 12 characterized by the fact that the cooling of said annular elements takes place by heating at first the portions of the development of the annular elements which have been vulcanized first until the whole development of the annular elements reaches a uniform temperature and cooling subsequently the whole development of the annular elements in a uniform manner.

14. The press according to claim 5 comprising a frame, a double-acting cylinder-piston group associated with said frame, a first assembly associated with the frame comprising two pairs of vulcanizing tables arranged symmetrically with respect to the longitudinal axis of the press, each table being provided with at least one groove in which a portion of an annular element is molded and vulcanized, a beam arranged along the longitudinal axis of symmetry of the press, a pair of interchangeable second assemblies, one at each end of the beam, each comprising two pairs of rollers placed symmetrically with respect to the longitudinal axis of symmetry of the press, one roller of each pair being provided with a drive and the other idle, a flat vulcanizing table inserted between the rollers of each pair of rollers, two cylinder-piston groups associated with the ends of said beam and two cylinder-piston groups associated with the pair of lower vulcanizing tables of said first assembly.

15. The press of claim 9 wherein said second means comprise an eccentricity between the axis of symmetry of said second axle and the axis of rotation of the bearing spindles of said second axle and means for moving said axis of symmetry with respect to the axis of rotation of the spindles.

16. An apparatus for vulcanizing and shaping an endless vulcanizable belt comprising.
a first assembly of a press comprising a pair of platens having facing heated surfaces with matching grooves in the surfaces which, when all the platens are disposed together to press a belt therebetween, combine to form channels which shape and vulcanize belt segments disposed therein, means associated on the press for moving the platens together to form the channels, heat and press segments of belts disposed in the channels, and,
a pair of interchangeable second assemblies each comprising a pair of facing platens having heated flat surfaces which can be sandwiched between the grooved platens of the first assembly, said flat surfaces closing the grooves on the platens of the first assembly to define said closed channels wherein the belt segments are shaped and vulcanized and means for moving new belt segments onto the platens of the second assemblies when it is coupled to the first assembly, and corresponding means of the first assembly means for coupling the first assembly alternately to one of the second assemblies with the platens of the first assembly abutting alternately with the platens of the coupled second assembly.

17. The apparatus of claim 16 wherein the means for moving said platens together to form channels is a hydraulically activated piston-cylinder assembly, the platens comprise means for steam heating them, the said first assembly is fixed against movement, and said means for coupling the said first assembly to one of the second assemblies comprises a hydraulic piston-cylinder for moving the second assembly towards and from the first assembly and for pressing the heated platens of the coupled assemblies together, and said apparatus comprises means for cooling the belt mounted on a second assembly when the second assembly is spaced away from the first assembly.

* * * * *